United States Patent [19]

Keusch et al.

[11] Patent Number: 4,684,558

[45] Date of Patent: Aug. 4, 1987

[54] ADHESIVE POLYETHYLENE OXIDE HYDROGEL SHEET AND ITS PRODUCTION

[75] Inventors: Preston Keusch, New York, N.Y.; John L. Essmyer, Hasbrouck Heights, N.J.

[73] Assignee: Nepera Inc., Harriman, N.Y.

[21] Appl. No.: 879,876

[22] Filed: Jun. 30, 1986

[51] Int. Cl.$^4$ ............................................. B32B 27/00
[52] U.S. Cl. ..................................... 428/40; 204/168; 204/169; 428/220; 428/290
[58] Field of Search .......................... 428/40, 220, 290; 204/168, 169

[56] References Cited

U.S. PATENT DOCUMENTS 4,524,087  7/1983  Engel ...................................... 427/2

Primary Examiner—Marion C. McCamish
Attorney, Agent, or Firm—Millen & White

[57] ABSTRACT

A solid sheet of adhesive hydrophilic gel which is a homogeneous aqueous mixture, substantially free of unbound water, monomers and crosslinking agents, consisting essentially of an amount dispersed uniformly in water of from about 4 to 35 wt % of a crosslinked polyethylene oxide, effective to form with the water a tacky surfaced viscoelastic solid which sheet of hydrophilic gel is produced by subjecting a liquid film of an aqueous solution having a viscosity of about $2-2,000 \times 10^3$ cps of a linear water soluble polyethylene oxide having a weight average molecular weight from about $0.02-6 \times 10^6$ Daltons to an amount of high energy radiation effective to convert the liquid film to a sheet of the viscoelastic solid having an adhesive face.

14 Claims, No Drawings

ADHESIVE POLYETHYLENE OXIDE HYDROGEL SHEET AND ITS PRODUCTION

BACKGROUND OF THE INVENTION

This invention relates to novel adhesive crosslinked polyethylene oxide hydrogel sheet materials which are capable of absorbing large amounts of aqueous solutions without losing their adhesiveness and to a process for their production.

This invention is related to concurrently filed application Ser. No. 879,877, filed June 30, 1986, entitled "Conductive Adhesive Medical Electrode Assemblies", whose disclosure is incorporated herein by reference, which claims such assemblies adapted for application adhesively to the skin to provide electrical contact therewith comprising, as a conductive member interfacing with the skin of a patient, a sheet or film of a hydrophilic gel of this invention. Medical electrodes of that type are well known in the art.

Hydrogel sheets adapted for use in medical electrode-related applications are commercially produced by Promeon, a Division of Medtronic, Inc. (Brooklyn Center, Minn.); Valleylabs, Inc., A division of Pfizer (Boulder, Colo.); Biostim., Inc. (Princeton, N.J.); Lectec Corp. (Eden Prairie, Minn.); and Conmed (Utica, N.M.).

Numerous U.S. patents disclose hydrophilic gels and medical electrodes employing them. The following illustrate the early state of that prior art.

U.S. Pat. No. 3,357,930 (electrically conductive transparent films comprising a polymeric matrix in gel form, a plasticizer therefor, an ionized electrolyte soluble in the plasticizer, and an ionizable solvent, e.g., solid polyvinyl alcohol, glycerin, lithium chloride and silica).

U.S. Pat. No. 3,911,906 (electrode with skin interfacing film of a pressure sensitive adhesive containing fine electrically conductive particles, e.g., an acrylic copolymer containing carbon powder).

U.S. Pat. No. 3,993,049 (electrode comprising a pliant patch of a formaminated material covered on the side adapted to be placed on the skin with a salt-containing adhesive).

U.S. Pat. No. 3,994,302 (stimulating electrode in which the skin contacting element is an ion-exchange material, e.g., a vinyl pyridine grafted to a polyethylene base).

U.S. Pat. No. 3,998,215 claims an electrically conductive pad which employs a hydrogel impregnated with a fibrous carrier. The polymers disclosed herein as operable require a chemical cross-linking agent. The commercial version thereof sold by the patentee (Minnesota Mining and Manufacturing Co.) has poor skin adhesion and contains bubbles (the latter presumably due to the viscosity of the starting gel and/or the technique employed to impregnate the fibrous carrier with the starting polymer solution). Bubbles in the conductive pad are undesirable because they create local areas of altered electrical properties.

Since the issuance of U.S. Pat. No. 3,998,215, numerous other patents employing a hydrophilic gel as an electrically conducting means which interfaces with the skin of the patient have issued. The following are illustrative of such patents.

U.S. Pat. No. 4,008,721 (tape electrode comprising a skin-contacting layer of adhesive material, e.g., acrylic copolymer).

U.S. Pat. No. 4,054,714 (electrically conductive adhesive useful for binding together surfaces of electronic devices, comprising a polymeric binder, conductive particles whose surfaces are a noble metal and a normally liquid polyhydric alcohol).

U.S. Pat. No. 4,067,342 (tape electrode for transmission of electrical signals into the body through the skin employing a tape having a surface of a conductive material combined with an adhesive, e.g., acrylic polymer adhesive, and a second surface with the conductive material comprising a magnetic substance.)

U.S. Pat. No. 4,066,078 (electrode with a skin interfacing film having adhesive, plastic and hydrophilic properties, e.g., produced from an interpolymer comprising (a) 10–90 parts of an ester of an $\alpha,\beta$-olefinically unsaturated carboxylic acid and a mono- or polyhydric alcohol; (b) 90–10 parts of an $\alpha,\beta$-olefinically unsaturated comonomer; and (c) at least 0.02 parts of a crosslinking agent comprising a difunctional monomer).

U.S. Pat. No. 4,092,985 (disposable electrode comprising an elastically stretchable layer of water permeable porous webbing permeated with a high water content liquid or semi-solid conductive medium).

U.S. Pat. No. 4,109,648 (electrode assembly comprising a self-supporting body of hydrogel, e.g., hydroxyethyl methacrylate polymerized with ammonium persulfate and sodium metabisulphite around graphite fiber).

U.S. Pat. No. 4,125,110; Re. 31,454 (electrode comprising as a skin interfacing substrate, a colloidal dispersion of a naturally occurring hydrophilic polysaccharide such as karaya, and a salt in an alcohol as a continuous phase).

U.S. Pat. No. 4,141,366 (electrode for transmitting electrical signals through the skin employing a normally "dry" adhesive which is activated at the time of application by a suitable solvent).

U.S. Pat. No. 4,273,135 (an essentially dry electrode employing as the conductive interface a cohesive, conformable, nonionic hydrophilic synthetic polymer plasticized with a monomer, e.g., glycerol. The electrode is applied to abraded skin wet with normal saline solution or water). This patent contains a detailed description of prior art electrodes in addition to those described and claimed (herein).

U.S. Pat. No. 4,274,420 (an electrode similar to U.S. Pat. No. 4,125,110 in which the adhesive substrate comprises a karaya gum matrix supporting na electrically conductive fluid).

U.S. Pat. No. 4,300,575 (an electrode with a conductive element composed of karaya, carbon black, isopropyl alcohol and karaya gum conductive solution).

U.S. Pat. Nos. 4,317,278; 4,318,746 and 4,362,165 electrodes comprising an annulus of foam with an electrode gel in the central region of the annulus, which gel is the subject of U.S. Pat. No. 4,318,746 and is composed of two polymers, one of which is hot water soluble, e.g., kappa carrageenan, and the other is not, e.g., hydroxypropylmethylcellulose, and which contains a potassium salt to enhance the gel's conductivity.

U.S. Pat. Nos. 4,365,634, 4,393,584; and 4,522,211 (electrodes with adhesive layer secured to a semi-flexible plasticlike sheet, e.g., Johnson & Johnson Co.'s "Bioadhesive", disclosed in U.S. Pat. No. 4,066,078, or in U.S. Pat. Nos. 4,008,721; 3,998,215; 3,993,049; and 3,911,906; preferably a hydrophilic material disclosed in U.S. Pat. Nos. 3,822,238, 4,156,066 and 4,156,067).

U.S. Pat. No. 4,383,529 (iontophoretic electrode device with a semi-solid hydrophilic hydrated gel formed, e.g., from agar, a protein or a synthetic polymer, e.g., methyl cellulose).

U.S. Pat. No. 4,458,696 (TENS electrode with an extensible interfacing layer of up to 10 mils thickeners comprised of a carrier portion coated with an electrically conductive adhesive, preferably a 75:25 butyl acrylate-acrylic acid copolymer neutralized with methyl diethanolamine to which are added a water-soluble plasticizer and tackifier, as described in U.S. Pat. No. 3,065,770).

U.S. Pat. No. 4,515,162 (electrode pad comprising a tacky crosslinked hydrogel adhered to an electrode terminal plate, e.g., a polyacrylic acid and a polyacrylic acid salt, water, and a compound containing at least two epoxy groups, as crosslinking component, and optionally a tackifier, e.g., glycerine, propylene glycol or polyethylene glycol, an electrolyte material, e.g., sodium chloride or potassium chloride, a pH controlling agent, a flexibility imparting agent, an antifungal agent, and the like).

U.S. Pat. No. 4,524,087 (electrode with a conductive adhesive thereon which is swellable, dermally-nonirritating conformable, coadhesive, ionic hydrophilic polymer, e.g., produced by UV polymerizing a mixture consisting of triethyleneglycol-bis-methacrylate dissolved in acrylate acid to which is added glycerol and potassium hydroxide in water, using a free radical initiator to initiate polymerization, e.g., a photoinitiator).

U.S. Pat. No. 4,543,958 (electrodes with conductive adhesive film comprising a naturally occurring karaya gum, e.g., available in sheet form from Lectec Corp. or as described in U.S. Pat. Nos. 3,357,930; 3,993,049; 4,066,078; and 4,141,366). However, unlike the specific hydrogels exemplified therein, which are non-tacky and essentially non-adhesive, the hydrogels of this invention are excellent adhesives. The reasons for this fundamental difference in a basic property will be apparent from the description of the hydrogels of this invention and the method of their preparation which follows.

European Published Patent Application No. 83 305 770.6 (Publication No. 0107376) discloses polyvinylpyrrolidone gel dressings which are non-rigid, sterile, tacky, transparent and absorbent, which have been crosslinked by ionization radiation and which are useful in the treatment of wounds, skin disorders and burns.

These gel dressings are formed from 10% to 25%, preferably 15-20% and most preferably 20%, crosslinked polyvinylpyrrolidone and water and irradiating with 1-3 Mrads radiation. Other patents also describe hydrophilic polymers crosslinked into gels, e.g., U.S. Pat. No. 3,998,215, which has polyvinyl-alcohol as the relevant polymer in concentrations up to 30%. These patents give no guidance as to the methods of formulation of a crosslinked absorbent flexible adhesive polyethylene oxide (PEO) sheet, as each polymer behaves differently. Indeed, very few water soluble crosslinkable polymers can meet all of the requirements of strength, absorbency, flexibility and adhesiveness possessed by the PEO gels of this invention and it is not possible to predict if a given hydrophilic polymer that is radiation crosslinkable is capable of forming a hydrogel sheet at any polymer concentration that meets all of the criteria of absorbency, adhesiveness, strength and flexibility. Past teachings and uses of crosslinked PEO hydrogel sheets emphasize the smoothness and east of removal of the sheet on a surface. The major concentration range greater than 6% for an adhesive PEO crosslinked hydrogel sheet was overlooked and their adhesive properties were undiscovered. The only direction given by previous teachings on dose was to achieve gelation where the teachings stated that (1) the dose to achieve a crosslinked PEO hydrogel was inversely proportional to concentration (U.S. Pat. No. 3,419,006), and (2) that the dose should be greater than 0.52 Mrads (U.S. Pat. No. 3,264,202, claim 6). Each of these criteria would not be helpful in synthesizing an adhesive PEO gel and would, in fact, be misleading. Polyethylene oxide water systems also have a unique response to high energy radiation. At low concentrations, crosslinking occurs by indirect effects, i.e., initiated with the solvent, whereas at high concentrations (the limited being PEO in solid form) the polyethylene oxide does not crosslink at all. This makes it even more difficult to predict the conditions to achieve effective combinations of absorbency, strength, flexibility, and adhesiveness.

Although hydrophilic gels are being marketed today, including gels in sheet form, none meet all the criteria of the adhesive sheets of this invention, viz., which are formed from an adhesive which is dermatologically inert, i.e., one which contains no organic solvents, residual monomer, chemical cross-linking agents or substantial quantities of uncrosslinked adhesive polymer; which is a viscoelastic solid, i.e., readily conforms to non-flat areas of the skin; which is sufficiently adhesive to adhere firmly to the skin, so that there is little likelihood of it falling off during use, yet it is not so adhesive that it causes pain and/or damage to the skin upon removal; which is adequately adhesive to moist as well as to dry skin and to soiled as well as to clean skin, so that skin pre-preparation with organic solvent or abrasive is not required; and which has a good shelf life in a sealed container which does not transmit water vapor through its walls; and whose properties do not readily deteriorate between the time the container in which the adhesive sheet is sealed is opened and before or during use. The adhesive sheets of this invention possess all of these and many other advantageous properties.

Adhesive films and sheets are usually less than 10 mils in thickness and most do not absorb any significant amount of water. The adhesive hydrogel sheets of this invention are at least 10 mils in thickness and are capable of absorbing at least their own weight and as much as ten times their own weight in aqueous liquid. Uses of this adhesive particularly relating to medical and cosmetic applications concern dressings, coverings, electrodes, controlled release sheets, surgical drapes, tapes and other applications particularly relating the skin. A particular advantage of the adhesive sheets of this invention are their purity and inertness and resultant biocompatibility to human tissue. Because the adhesive sheets are produced from high molecular weight polyethylene oxide linear polymers, which are notable for their biological inertness, and water and are crosslinked by high energy irradiation, they contain no crosslinking agents or free adhesive additives. Also, the irradiation contributes to hydrogel sheet purity in that the irradiated sheets as produced are inherently sterile or at least containing very low microorganism counts which further adds to the overall purity of the final adhesive product. In fact, one of the key features of this invention is that by choosing the proper conditions of molecular weight and concentration for the water soluble polymer and imparting the proper irradiation dose, hydrogel sheet material can be made with various degrees of adhesiveness. In the prior art relating to crosslinked polyethylene oxide hydrogel sheet materials, there is no reference to their adhesive properties nor are there any teachings as to how to make them highly adhesive in the manner of this invention. In fact past teachings refer to pitutous stringy polyethylene oxide hydrogels which are adhesive but weak and non-cohesive or strong cohesive frictionless gels which are non-adhesive.

OBJECTS OF THE INVENTION

It is an object of the invention to provide novel adhesive sheets formed from a hydrophilic gel which consists substantially of water and a crosslinked polyethylene oxide homopolymer.

It is another object to provide such adhesive sheets whose hydrophilic gel is biologically inert.

It is another object to provide such an adhesive sheet which adheres to the skin when affixed thereto without the necessity of skin pre-preparation, e.g., abrasion and/or drying with solvent.

It is a further object to provide such an adhesive sheet whose adherence to the skin is not adversely affected by the presence of normal amounts of moisture on the skin.

It is a further object to provide such an adhesive sheet which can be peeled off the skin after use without damage to the skin and without having a noticeable residue.

It is a further object to provide such an adhesive sheet whose hydrophilic gel is free of leachable ingredients, e.g., monomers, plasticizers, crosslinking agents, tackifiers, etc.

It is a further object to provide such an adhesive sheet whose hydrophilic gel does not readily lose its water content upon exposure to ambient atmosphere.

It is a further object to provide methods for producing adhesive sheet materials having the properties of the products of this invention.

Upon further study of the specification and appended claims, further objects and advantages of this invention will become apparent to those skilled in the art.

SUMMARY OF THE INVENTION

In an article of manufacture aspect, this invention relates to a sheet of adhesive crosslinked hydrogel which is more cohesive than it is adhesive to human skin and is removable from the skin without leaving a noticeable residue on the skin and which is a homogenous aqueous mixture, substantially free of unbound water, monomers and crosslinking agents, of about 65 to 96 wt % water and an amount dispersed uniformly throughout the water of from about 4 to 35 wt % of a crosslinked polyethylene oxide, effective to form with the water a tacky surfaced viscoelastic solid, which hydrophilic gel is produced by subjecting a liquid film of an aqueous solution having a viscosity of about $2-2,000 \times 10^3$ cps of a linear water soluble polyethylene oxide having a weight average molecular weight from about $0.2-6 \times 10^6$ Daltons to an amount of high energy radiation effective to convert the liquid film to a sheet of the viscoelastic solid.

In a method of manufacture aspect, this invention relates to a method of manufacturing a sheet of adhesive crosslinked hydrogel of this invention which comprise the step of subjecting a liquid film of an aqueous solution having a viscosity of about $2-2,000 \times 10^3$ cps, of a 2-25 wt % linear water soluble polyethylene to an amount of high energy radiation effective to convert the liquid film to a sheet of the viscoelastic solid.

DETAILED DISCUSSION

The hydrophilic gels employed in this invention are unique in that they consist predominantly or almost entirely of water, they are substantially free of unbound water. This is an important property for several reasons. First, it means that the gel does not "bleed" free water under the influence of pressure and/or elevated temperatures, which bleeding can adversely affect the adhesiveness of the sheet. Second, it means the gel is not "broken" if subjected to temperatures below the freezing point of water. This is very important from a storage and shipping stability point of view. Finally, it renders the gel more resistant to "drying out" after being removed from its sealed gas and moisture impermeable package.

Because sheets of adhesive hydrogels must be sterile, when used as bandages or as the skin contacting member of medical electrodes, the packaging of the sheet must ensure such sterility. Although this cannot conveniently be achieved conventionally by autoclaving, since this could adversely affect the polymer or alter the moisture content of the gel, sterility can readily be accomplished by other means, e.g., with ethylene oxide or by packaging the hydrogel sheet as an integral part of the high energy radiation step of converting the starting liquid polymer solution to a solid hydrogel, which effectively sterilizes the hydrogel and associated structural and packaging materials.

The hydrogels of this invention are characterized by being tacky surfaced viscoelastic solids having an adhesive face which, in the rolling ball tack test described hereinafter, typically give a rolling ball distance of less than about 10 mm and typically give an adhesion energy force in the Adhesion Energy Density Determination Test described hereinafter of about 2 to 80 g-cm/cm$^2$ which adhesive sheets have greater cohesive strength than adhesive strength, whereby the sheet can be removed from a surface to which it is affixed without leaving a visible residue. Their surface tackiness or stickiness is so pronounced that tactile examination thereof leaves one with the strong impression that a residue should be left on the skin when a sheet of the gel is peeled off therefrom. However, the sheets are integral single structures, much like a film of thermoplastic polymers. Therefore, they have excellent cohesive strengths greater than their adhesive strengths which prevents material from separating from the sheet when it is peeled off a surface, e.g., human skin, to which it is affixed.

The hydrophilic gels are a homogeneous aqueous mixture of water and a crosslinked polyethylene oxide (PEO). Not only are they substantially or completely free of unbound water, the advantages of which are discussed above, they are substantially free of discrete uncrosslinked polymer which could settle, leach or bleed out or otherwise adversely affect the physical or chemical properties of the gels.

IRRADIATION CROSSLINKING

These crosslinked PEO polymers and the sheets of adhesive hydrophilic gels of this invention produced therefrom by irradiation with high energy radiation are described generically in U.S. Pat. Nos. 3,264,202 and 3,419,006, whose disclosures are incorporated herein by reference. However, the specific highly sticky or tacky hydrophilic gels of this invention are not disclosed therein. Such gels are produced by employing higher concentrations of starting linear PEO polymers than the minimum needed to produce a solid gel and modifying the amount of radiation to which the starting liquid film is subjected. In other words, low solids and/or high radiation gels are less tacky than high solids, low radiation gels produced from the same starting water soluble linear PEO. Similarly, lower molecular weight starting linear PEO at high solids contents produces stickier hydrophilic gels than higher molecular weight starting polymer at correspondingly lower solids content. Therefore, whereas the preferred polymer contents of the gels of U.S. Pat. No. 3,419,006 is between 2 and 6 wt %, those of the gels of this invention are about 4 to 35 wt %, depending on the molecular weight of the starting polymer. Whereas the starting linear PEO of the examples of that patent had a molecular weight of $3 \times 10^6$ Daltons and was employed at a concentration of 2 wt %, the starting polymers of the Examples of this invention had molecular weights between 0.6 and $5 \times 10^6$ Daltons and were employed at concentrations of 4 to 20 wt %. The higher concentration of PEO produced a tackier surfaced hydrogel than the lower concentrations.

Flexible high polymers tend to crosslink in the presence of high energy irradiation, such as by high energy electrons or Beta particles. The usual overall occurrence is the abstraction of hydrogen from the backbone of the polymer chain forming free radicals on the chains which then couple forming a crosslink between the two chains. When this process occurs in the bulk system and on the average there is at least one crosslink per chain, a network is formed and the system is considered crosslinked. What is called "gelation" has occurred. At the same time, degradation is also occurring as a result of the absorption of high energy. If the number of crosslinking events are occurring at a higher rate than degrading or chain scission events, the net result is crosslinking. For flexible high molecular weight polymers the ratio of crosslinking events to degradation events is greater than one. A similar process of crosslinking and degradation occurs for polymers in solution when subjected to high energy irradiation. However, in solution a number of other factors can be ongoing that may alter the course of crosslinking and degradation events. First, the solvent may drastically alter the flexibility of the polymer in solution. If the polymer at a given concentration is more flexible, it will crosslink more readily than the polymer in a solid state. In some instances, e.g., in the case of polyethylene oxide, the polymer in solution initially predominantly crosslinks whereas the pure polymer actually degrades as a net effect of high energy irradiation. The solution may also alter the formation of free radicals. In some systems, free radicals may actually form in solution and then interact with the polymer backbone to induce crosslinking. In this case, this solutioninduced process is called an indirect effect. On the other hand, the high energy irradiation may interact directly with the polymer itself to induce crosslinking, which is called a direct effect.

There are other factors, e.g., impurities and molecular weight distribution, which affect the course of crosslinking in a polymer or polymer solvent system, but with proper control by those skilled in the art the same net effects can be achieved. Whether crosslinking or degradation occurs or their relative rates are altered is frequently also determined by the presence of oxygen in the system. The presence of oxygen can be overcome by using a high dose rate of high energy, such as an electron beam, rather than a low dose rate source, such as cobalt 60. In so doing, the initial amount of oxygen present in the system is used up by a small fraction of the applied dose and the rest is utilized for crosslinking, all at such a dose rate that fresh oxygen does not have the chance to be replenished by the slower process of diffusion. The effect of molecular weight distribution generally alters the efficiency of crosslinking in a given polymer system. If all things are equal, a system with a narrow molecular weight distribution crosslinks more efficiently and requires a lower radiation dose to gelation and to a given degree of crosslinking. The major requirement is that there is little low molecular weight fraction, such as oligomer or low molecular weight polymer in the system, as these components drastically shift the crosslinking efficiency of the system.

A simple means of determining the effect of crosslinking is by measuring the insoluble fraction of polymer (gel) formed after the uncrosslinked polymer (sol) receives a given radiation dose. Typically, gelation is determined by swelling the crosslinked polymer in an excess of solvent for a sufficient period of time to extract all of the soluble (uncrosslinked) polymer. The remaining insoluble fraction is crosslinked polymer. Consequently, if one wants to compare how different polymer systems crosslink or determine how a given system crosslinks at a given dose, one determines the gel-dose curves of the systems, or the amount of gel produced at a given dose. The earlier and faster the gel increases at a given radiation dose the more efficient is the crosslinking process. The point on the curve where a typical geldose curve is first formed is called the gelation dose $r$gel (A). Immediately thereafter, the fraction of gel increases sharply as more and more of the polymer chains become part of the crosslinked network (B). Eventually the gel fraction reaches a plateau (C) where no more crosslinking takes place. This occurs because the fraction of lower molecular weight polymer which crosslinks at this point does so very inefficiently and because there is always a certain amount of degradation occurring simultaneously. All of this leads to a net maximum in crosslinking.

HYDROGEL SHEET

Strength and Absorbency

The process of irradiation crosslinking an aqueous solution of polyethylene oxide results in the production of a single phase viscoelastic solid hydrogel, even though the starting solution may consist of as much as 96% water. This viscoelastic solid consists of a loosely structured entanglement of polymer molecules solvated in aqueous solution and randomly crosslinked to each other in a network by primary chemical bonds. Such a flexible crosslinked system behaves very much according to the laws of rubber elasticity. The network system expands and contracts reversibly. Its strength increases with the number of crosslinks or its crosslink density. The crosslinked system is also able to absorb quantities of solvent with the quantities decreasing with the degree of crosslinking.

On the molecular level, one of the best ways of quantitatively describing the density of crosslinks in the network system is by using the average molecular weight between crosslinks ($M_c$). This number expresses the number of repeat units between primary bonds attaching previously distinct polymer chains into a network. The lower the $M_c$ value for a given polymer network, the higher its crosslink density and the higher its strength. On the other hand the swelling characteristics of the network system decrease. The lower the $M_c$, the less the system can thermodynamically absorb a given solvent.

The control of the strength and absorbency for a viscoelastic adhesive hydrogel sheet is very important. The strength of the hydrogel sheet is important from the point of view of handling and particularly removal from a surface, such as human skin, to which it is affixed. If the gel is weak and poorly formed it will have higher adhesive strength than cohesive strength and it will come apart and stick to the surface during removal. A low strength, low crosslink density, high $M_c$ gel will be stringy, pituitous and will rupture easily, making it generally difficult to handle. On the other hand, the absorbency for solvents of such a low strength network system will be high. This is very desirable for a viscoelastic adhesive intended for use in moist environments, such as human skin, where absorbency in the presence of perspiration and/or exudates under the adhesive sheet is required. If the sheet has little moisture absorbency, a second aqueous phase (a parting surface) will form between the sheet of adhesive and the skin, thereby breaking the adhesive bond therebetween. Consequently, it is highly desirable that a viscoelastic adhesive hydrogel sheet intended for such end uses has a high moisture absorbency as well as high strength by proper balancing of starting polyethylene oxide polymer concentration and irradiation dose. Viscoelastic hydrogel sheets can be produced according to this invention which have good adhesiveness, cohesive strength and moisture absorbency.

HYDROGEL SHEET

Adhesive Structure

The adhesion of one substance to another depends upon many factors, including wetability, surface roughness, exclusion of air pockets are important general factors. In the case of polymers, the nature of the functional groups, if any thereon, the amount of polymer chain spreading on the surface and how far the adhering polymer extends back into the adhesive phase itself are also important factors affecting adhesive strength. For the polymer chain to extend properly on the adhering surface and have bonds in the adhesive phase, flexibility is important as well.

The formulation of an adhesive crosslinked hydrophilic polymer gel requires a balance on crosslink density. For a polymer of a given molecular weight and given concentration in aqueous solid solution, a too high crosslink density, resulting from too high irradiation dose, will yield a non-sticky "dead" surface. On the other hand, a too low crosslink density will yield a substance that has very poor physical strength, is hard to handle and which may indeed adhere but would leave a residue on the surfaces to which it is affixed, since the adhesive strength of the hydrogel will be greater than the cohesive strength thereof. This is usually the case with a layer of adhesive on a substrate backing because the adhesive bond is usually stronger than the actual adhesive phase and rupture occurs partially within the adhesive phase which results in a residue being left when the adhesive material is removed.

The optimum concentration of a polymer of any given molecular weight in the hydrogel is determined by a number of factors. From the point of view of strength, as high a concentration as possible is desirable to give maximum chain density. On the other hand, tack (adhesive bond strength) can be adversely affected too high polymer concentration, due to the lack of mobility of the high polymer molecules as well as by increased molecular entanglements. Thus, a polymer that exhibits good wet tack at low concentrations in a hydrogel will exhibit no tack at all in the dry state. Another limiting factor is processability. Generally, the viscosity of a water soluble high polymer in solution increases with concentration in an exponential fashion. If one attempts to produce a crosslinked hydrogel sheet at too high a polymer concentration, the starting mix becomes too viscous to be processed in a practical manner.

The adhesive properties of a polymer depend upon its functional groups, its molecular weight and the conformations of its molecules at the gel-skin interface. The functional groups on the polymer chain must be capable of associating with the functional groups on the skin to form surface bonds whose strength generally increase with the molecular weight of the polymer. In addition, the molecular weight of the polymer must be above a minimum value, depending upon the nature of the functional groups of the polymer. This critical minimum molecular weight is that at which the polymer still behaves as a high molecular weight polymer, i.e., there are extensive long range interactions such that due to the sheer number of connected functional groups, intermolecular attraction is sufficient to provide the requisite strength in the solid state. The situation is similar to solid polymeric adhesives, i.e., the polymer molecules must be of sufficient length to impart significant bond strength between the polymer phase and the surface to which it is to adhere.

Also of importance are the conformations of the polymer molecules at the bond interface. For example, a polymer molecule that is very flexible is more capable of interacting with functional groups on the skin as a result of the hydrogel spreading onto the skin, thereby maximizing functional group interactions. Such flexibility, seen in terms of segmental motion, also allows the functional groups to physically rearrange in order to maximize the interaction of the functional groups with the skin.

In the synthesis of an adhesive, crosslinked hydrogel sheet, it is first necessary to achieve a radiation dose above that which first gives gelation, i.e., the inception of crosslinking. At this point, the previously viscous liquid begins to attain the properties of a solid but is still extremely weak. This liquid or semisolid may exhibit extremely high tack but its low strength and extreme stickiness produces a sheet or film of the gel of little practical value. However, as the gel is exposed to higher radiation doses, its cohesive strength increases. In fact, its cohesive strength, as measured by its modulus of elasticity, is directly proportional to irradiation dose for a flexible crosslinked polymer of any given chain density or concentration. Initially, surface tack is not significantly affected. However, a dose is ultimately reached where the material begins to lose its tack ($r_{imob.}$), i.e., crosslink density increases so much that the molecular weight of the sections of polymer between crosslinks has become small enough that chain flexibility is reduced. At this point, it is not possible to predict whether a proper balance of adhesive and cohesive strengths will be achieved with the polymer being crosslinked. To do so requires a radiation dose high enough to produce a gel sheet having acceptable cohesive strength. As a general proposition, it can be stated that the cohesive strength of the gel must exceed the adhesive strength of the bonds produced when the sheet is affixed to an intended surface, e.g., human skin. Although the inclusion of a scrim can improve the handling properties of the sheet and its resistance to tearing it cannot prevent delamination of the gel when the sheet is removed, thereby leaving a residue on the surface, if adhesive strength exceeds cohesive strength in any portion of the sheet.

In addition to loss of adhesiveness resultant from the poor surface contact achieved by a highly crosslinked molecule, another adverse effect of too high a radiation dose is the loss of aqueous absorbency, i.e., equilibrium capacity, which also decreases with decreasing tack. From the theory of equilibrium swelling of crosslinked networks, the equilibrium capacity is inversely proportional to the radiation dose raised to the 0.6 power. Exceeding equilibrium capacity results in phase separation of water molecules from the swollen polymer network, which causes a film of water to form on the surface of the hydrogel sheet which renders the surface non-tacky. Although it is readily apparent that an irradiation dose must be employed which is greater than $r_{gel}$ (to produce a solid sheet) and less than $r_{imob}$ (to retain adhesiveness), it is very difficult to predict the effect of crosslinking on both strength and aqueous absorbency on any given aqueous polymer system and it is impossible without appropriate experimental irradiation runs at various levels of polymer solids content and radiation levels relative responses of strength and absorbency to radiation induced crosslinking of a given aqueous polymer system. For workable adhesiveness it is not possible to predict that any given composition will have an acceptable combination of strength, aqueous absorbency and tack surface because $r_{imob}$, may be less than or equal to the dose that imparts adequate strength to the gel. A priori there is no way of knowing if polyethylene oxide can give a hydrogel sheet with the right combination of strength, absorbency, flexibility and adhesiveness that is the invention of this application.

To achieve the proper balance of strength, adhesiveness and aqueous absorbency with any specific polymer system, the following parameters are required of a method employed to produce an acceptable adhesive crosslinked sheet from a dispersion of a water soluble polyethylene oxide in water using high energy irradiation.

As a result of the foregoing, the following parameters are required of a method employed to produce an adhesive crosslinked sheet from a dispersion of a water soluble polyethylene oxide in water using high energy irradiation.

To assure the proper surface tack and cohesive strength a polymer of a molecular weight of at least about $0.2 \times 10^6$ must be utilized and at a solids concentration of greater than about 6%. Operable irradiation doses also depend on molecule weight and molecular weight distribution of the starting polymer and the impurities in the feed solution. Generally, however, a dose greater than about 0.2 Mrads is required to impart cohesive strength and render the hydrogel non-pituitious. On the other hand, there is a limitation on the upper dose any given formulation can achieve to prevent loss of adhesiveness flexibility and absorbency. The maximum upper dose is determined primarily by the concentrations of the starting uncrosslinked polymer in the aqueous system. In the light of the foregoing factors that affect the degree of crosslinking of a polymer solution, an operable irradiation dose range can be defined functionally as that which yields a hydrogel sheet product of acceptable cohesive strength at the low end of the range and which retains an acceptable adhesive strength at the high end of the aforesaid defined range, which is given as a function of polymer concentration for a polyethylene oxide of weight average molecular weight greater than about $0.2 \times 10^6$ Daltons. Other factors such as impurities, the addition or removal of oxygen, the alteration of molecular weight distribution or the use of additives, may shift this range, but they are not crucial to producing a adhesive hydrogel sheet of this invention. Instead, they merely require a shift in irradiation dose to compensate for a loss or gain in radiation efficiency. Both ranges increase with polymer concentration (C), in units of weight percent). The bottom of the dose range L(C), i.e., where the sheet is both adhesive and has just adequate cohesive strength, is given by the function:

$$L(C) = 0.001556C + 0.4562 - 1.001/C$$

On the other hand, the top of range U(C), i.e., where the sheet has acceptable sufficient strength but has just adequate adhesive strength, due to excessive crosslinking, is given by the function $$U(C) = 0.03730 - 1.245 - 3.908/C$$

Contemplated equiValents of the hydrogel sheets of this invention are polyethylene oxide copolymers blends of polyethylene oxide and other polymers or copolymers which are radiation crosslinkable under substantially the same conditions as the corresponding polyethylene oxide homopolymers to form a crosslinked adhesive hydrogel sheet. An example is a co-crosslinked mixture of a major amount (more than 50%) of polyethylene oxide and a minor amount (less than 50%) polyvinyl pyrolidone. In this instance, both starting materials separately produce adhesive crosslinked polymer gels. Similarly, polyethylene oxide homopolymer can be blended with a minor proportion of another non-adhesive polymer and still give an acceptable crosslinked adhesive hydrogel sheet. An example is a blend of polyethylene oxide and/or carboxymethylcellulose. In a similarly mode of application, a water soluble tacky crosslinkable polymer can be blended with inert fillers and still yield a crosslinked, tacky hydrogel sheet. In this instance the major requirement is that the tacky crosslinkable polymer must be the continuous phase in the sheet formed which requires the wetting out and complete encapsulation of the inert filler by the initial polymer starting solution.

As stated above, the sheets of hydrogels of this invention are characterized by exceptional surface stickiness while possessing sufficient cohesiveness to maintain structural integrity when removed from the skin.

The manner in which a hydrogel sheet or film of this invention adheres to surfaces, e.g., to the skin, is an important aspect of this invention. The hydrogel adheres quickly and tenaciously to both dry and damp, clean and soiled skin. It is extremely tolerant to perspiration which forms on the skin under the hydrogel after the adhesive sheet is applied to the skin, because the hydrogel can absorb a substantial amount of water before it loses its surface tack. Conversely, because it is at least 65% water, it does not create chemical bonds with the skin and hair which results in pain and/or skin damage when employing a conventional adhesive-based skin interfacing member is removed after use.

To test for skin adhesiveness, samples of the hydrogel with backing removed from one side were applied to the skin of various subjects and left on for at least 24 hours. This was done with the scrim-containing hydrogel films. How well the hydrogel adhered to the skin was observed and how easily the hydrogel could be separated from the skin was noted, along with whether or not any residue was left on the skin.

The adhesiveness of the conductive hydrogel sheet or films can be quantified by the "Tack Rolling Ball Method" (TRBM) as specified by the Pressure Sensitive Tape Council, was measured. This test method for adhesive materials is detailed in The American Society for Testing Materials, Designation D3121-73(Re-approved 1979), which test method is under the jurisdiction of ASTM Committee D-14 on Adhesives. The test utilizes an inclined trough which can be obtained through the Pressure Sensitive Tape Council, 120 Waakegan Road, Glenview, Ill. 60025, that is equipped with a release lever at the top through which a 11 mm diameter steel ball is released onto the trough. The ball gains momentum as it descends the incline and rolls onto the adhesive surface whose adhesiveness is being measured. The shorter distance the ball travels thereon, in the test, the higher the adhesion value of the adhesive.

The test is performed as follows: Remove the backing materials from both sides of a hydrogel sample cut one inch wide and at least three inches long. The test is run in a controlled environment (72° F.±5° F. and 50% relative humidity). A hard, level horizontal surface of sufficient size to conduct the test is selected. Both metal and glass plates have proved satisfactory. Before testing each adhesive sheet, clean the inclined trough thoroughly with isopropanol.

The specimen to be tested is placed flat, adhesive side up, in line with the inclined trough. The end of the specimen opposite the incline is held to the table. Only one test is run on each specimen. Each time before the ball is rolled onto the hydrogel, it is thoroughly cleaned with isopropanol, which removes any residue that might otherwise remain from a previous test, and then wiped with a lint-free, bleached, absorbent material to remove any remaining residue. After cleaning, do not touch the ball or raceway. Use clean, dry tongs to place the ball on the upper side of the release. Release the ball and it will roll to a stop on the adhesive material. Measure the distance from the point where the ball initially contacts the adhesive to where the ball stops. The average of the stopping distance measurements of five or more tests is recorded. Pertinent additional comments based on visual inspection such as noticeable residue on ball, lift of adhesive from substrate, etc., are also noted.

In this test, the hydrophilic gels of this invention have tack rolling ball distances of less than about 10 mm. The preferred gels have distances less than about 7 mm.

The adhesives making up the sheets of this invention, including those with very high tack, i.e., those that have a tack rolling ball distance of less than 2 mm, do not damage the surface of the skin and/or pull hair when they are removed after use.

Another test to measure relative strength and stickiness of an adhesive bond is the Adhesion Energy Density Determination Test. This test measures how well a hydrogel sheet adheres to a flat surface. The adhesion energy density which is measured is the combined strength of the surface bond of hydrogel sheet to the flat surface and the strength of the hydrogel sheet itself.

A sample of the hydrogel sheet to be tested is placed unbacked on a clean flat stainless steel block. The block in turn is placed on a block of flexible foam which in turn is placed on a test stand. With the setup in place a steel ring is placed on top of the test sample and aligned with the test probe to be used so that the latter will descend therethrough without touching the ring. A polymethylmethacrylate test probe then descends into the sample at a constant rate to a constant depth. (In the hydrogel films tested, the descent rate was set at 0.5 mm/sec. and the penetration was set at 1.0 mm.) Before the test, the probe is cleaned with isopropanol or distilled water and dried with a lint-free cloth to make certain no residual adhesive material is on the face of the probe before the test is begun. The tests described below were run at 72° F.±5° F. and at a relative humidity of 50%±5% and each test sample was stored at these conditions for at least one hour before the test. When the test probe has made its 1 mm descent into the hydrogel film and begins its return (at a rate of ascent of 0.344 cm/sec), the adhesive sample being tested has adhered to the face of the test probe. From the start of the return of the probe to complete separation of the test sample from the face of the probe, the force on the probe and the corresponding displacement is recorded using a Voland Stevens LFRA Texture Analyzer and Recorder (Voland Corporation, Hawthorne, N.Y.). The area under the force-displacement curve is the adhesion energy. For the 1.5 inch diameter probe used, it is the adhesion energy per 11.4 $cm^2$. For the work reported herein, the force was measured in grams and the displacement measured in centimeters so that all adhesion energies are reported in g-cm for a 11.4 $cm^2$ surface area as adhesion energy density (AED).

In this test, the hydrophilic gels of this invention display adhesion energy forces of about 2 to 80 g-cm/$cm^2$ (11.4 $cm^2$). The preferred gels give values of greater than 7 g-cm/$cm^2$ (11.4 $cm^2$) in this test.

The enhanced adhesive properties of the hydrogel sheets of this invention are demonstrated according to their adhesion energy densities and tack rolling ball distances in Table I. To show the difference and large improvement in adhesion and tack of the formulations in this invention, a hydrogel sheet of 2% polyethylene oxide of $4 \times 10^6$ molecular weight and irradiated to 0.5 Mrads, which is in the range covered under U.S. Pat. No. 3,419,006, is also included in Table I below. In each instance the hydrogel sheet was reinforced with a scrim as described in the Preparation of Hydrophilic Gel section hereinafter.

To corroborate that the physical tests for adhesion and tack, viz., the Tack Rolling Ball Method and the flat plate adhesion energy test, accurately translate to adhesion on the skin, a number of adhesive sheets of this invention were subjected to peel tests on the skin of actual human subjects and also reported in Table I. One inch wide samples of 10 inches total length were prepared. 5" (five) inches were applied lengthwise to the forearm of a subject. The skin was first cleaned with distilled water and then dried before the application of the adhesive strip. One inch of the other end of the strip was placed in the jaws of a Chatillon Tensile Tester, model DFG, Johnson Chatillon & Sons, Inc., Greensboro, N.C., such that at rest, before the application of tension five inches adhered to the skin, four inches were vertically suspended from the skin to the tip of the working jaw and one inch was secured in the working jaw. The jaw then advanced in tension at a rate of 10 inches/min. and peak force was measured. These tests were conducted in an environment that was at 75° F.±5° F. and 50%±5% relative humidity. Five (5) subjects were used for each measurement. The results of these tests (Peel Strength) are also given in Table 1.

TABLE I

| Ex. | Mol. wt. × $10^6$ | wt % Polymer | Rad. Dose (Mrad) | Adhes. Energy Density (g-cm/cm$^2$) | Tack Rolling Dist. (mm) | Peel Str. (g) |
|---|---|---|---|---|---|---|
| 17 | 0.9 | 9 | 0.4 | 49.6 | 0 | 36.3 |
| 18 | 0.9 | 9 | 0.5 | 40.7 | 0 | 31.8 |
| 21 | 4.0 | 4 | 0.5 | 4.1 | 15 | 4.5 |
| * | 4.0 | 2 | 0.5 | 0.4 | 151 | 2.0 |

*Comparative Example according to 3,419,006

The hydrogels of the adhesive sheets of this invention which are intended for skin application, such as medical dressings on wounds, desirably are highly crosslinked to ensure that polymer leaching therefrom by exudate or perspiration is limited or precluded. A test method that quantitatively measures the extent of crosslinking of a polymer system is the extraction test described hereinabove. Specifically for the gel values reported in this invention, the following conditions were used for the extraction. A sample of crosslinked sheet two inches by two inches and weighing approximately 2.5 grams was extracted in 200 ml of distilled water for 72 hours at a temperature of 25° F.±5° C. The excess water was then removed from the swollen sheet which was then weighed. This sheet was then placed for 24 hours in an oven maintained at 50° C.±5° C. Upon removal from the oven the dry gel was then weighed. The weight of dry gel divided by the original weight of polymer in the sample is the gel fraction (g). The results are usually reported as percent gel.

Another important feature for an adhesive sheet that is intended for utilization in wound management applications is its absorptive capacity, because an adhesive on the skin can readily lose its adhesive bond due to a layer of perspiration accumulating at the interface. Moreover, if an adhesive material is utilized as a wound dressing it must be capable of absorbing the exudate from the wound, as this is one of its primary functions. If the gel cannot do so, it will also lose its adhesive bond and move from the site where it was intended to function. For these reasons it is very important for the adhesive sheet to have good equilibrium or absorption capacity for aqueous liquid.

A test method that quantitatively measures the absorption capacity of a crosslinked polymer system is the swelling test. The test method proceeds in exactly the same manner as the extraction test previously mentioned, up to the point of extraction. The weight of the extracted sheet with unbound excess water removed from the surface divided by the weight of the original sheet is the swell ratio (SR). This value is then divided by the original weight fraction of polymer (C) and the fraction gel (g) found from the gel test to give the equilibrium capacity (EC) of the network formed, according to the formula $$EC = \frac{SR}{gc}$$

Typical degrees of crosslinking and absorption capacities of the hydrogel sheets of this invention, as expressed by the percent gel (%g) and equilibrium capacity (EC) respectively, are given in Table II. It is noteworthy that even at high % gels there is high EC, even though the percent gel increases with crosslinking while the EC decreases. This is fortitutous as there is no guarantee that good EC's or swell ratios (SR's) could be achieved at high percent gels.

TABLE II

| Ex. | Mw ($10^6$) | Conc (%) | Dose (Mrad) | Gel (%) | EC (g/g) | SR |
|---|---|---|---|---|---|---|
| 9 | 0.6 | 18 | 0.5 | 86.0 | 61.6 | 9.5 |
| 17 | 0.9 | 9 | 0.4 | 79.8 | 72.4 | 5.2 |
| 18 | 0.9 | 9 | 0.5 | 82.9 | 60.3 | 4.5 |
| 25 | 4.0 | 8 | .35 | 88.4 | 94.5 | 6.7 |
| 26 | 4.0 | 8 | .5 | 82.8 | 69.4 | 4.6 |
| 36 | 5.0 | 8 | .5 | 79.0 | 53.5 | 5.4 |

Because the PEO is crosslinked by high energy radiation, it is free of both residual monomers and chemical crosslinking agents, a very important consideration for a device which is to be affixed to the skin. If desired, the gel optionally can contain preservatives, antifungal agents, a bacteriostat and the like, bearing in mind that unless special steps are taken to incorporate any such agents into the gel after it is formed, e.g., by application of a film of an aqueous solution thereof to one or both faces of the sheet of hydrophilic gel, the materials selected must be able to withstand the irradiation employed to produce the hydrophilic gel and can change the radiation doses required to give a product with enhanced adhesion and sufficient strength.

As such additions may be included in formulations at levels of 5% or less, the effect of the additive can behave as an impurity in the radiation crosslinking process. This usually requires a shift upward in the radiation dose to reach the same level of crosslinking. This is a familiar adjustment to those skilled in the art of radiation crosslinking.

GENERAL CHARACTERISTICS OF THE HYDROGELS

The following is a summary of the properties of the hydrophilic gels of this invention.

Biocompatibility

The hydrophilic gel is inert and is not metabolized. It has a normal pH of about 7, which is allowed to "float" between 6 and 8. It has a zero irritation index. Because it is produced by irradiation, the gel is virtually or completely sterile, with less than 10 colonies per cubic centimeter (the measurable limit).

The hydrogel contains no extraneous or objectional ingredients. It does not contain extraneous chemicals such as monomers and crosslinking agents, which are present in chemically linked crosslinked gels, or solvents, etc., which are an integral part of formulated adhesives. All ingredients have proven bioacceptability on contact with the skin. Normal exudants flow into the matrix of the gel, away from the user's skin.

Hydrophilic Characteristics

The hydrogel contains no free water. The water in the hydrogel is an integral part of the gel molecular structure and therefore cannot be separated therefrom by physical means such as pressure. Thus, the matrix remains homogeneous under gravity and even with freezing. Its imbibing property enables the hydrogel to cleanse the body surface of water soluble exudates and secretions by drawing them up into the gel by osmosis, thus lowering the skin irritation factors commonly associated with other organic polymers. The gel pad has a distinct advantage of conforming itself to the irregularities of human skin, producing a substantially uniform contact.

Adhesive Prooerties

The hydrogel's adhesive characteristics are a function of its ability to conform to minute irregularities on the surface on which it is placed, while retaining its cohesive properties. This characteristic meets the criteria of an adhesive without the necessity of additional chemicals. The degree of adhesion to a given surface is a function of the degree of irregularity or porosity of the surface. The hydrogel retains its adhesive quality even while absorbing normal perspiration. The viscoelastic properties of the hydrogel within the gel structure allows it to flow into the tiny interstices of the surface to which it is placed, thereby allowing intimate uniform contact between itself and that surface. This type of adhesiveness allows it to adhere to skin without employing additional chemical bonding agents, which permits the hydrogel to be removed from the skin without pain, skin damage or hair pulling and without leaving any residual components of the gel on the skin itself, as the components of the gel are permanently bound within the gel structure.

Preparation of Hvdrophilic Gel

A hydrogel sheet suitable for use as a medical adhesive can be produced by mixing the water soluble linear polyethylene oxide and water to form a viscous feed. A convenient procedure is to gradually blend the dry polymer into the appropriate amount of water, either at ambient or elevated temperatures. The viscous liquid feed is then applied to a flat surface to form a liquid film thereon, e.g., a film of polyethylene or a polyethylene coated sheet of paper. To contribute to the strength of the hydrogel, both in tension and flexure, a low areaweight scrim can be incorporated into the film during fabrication before crosslinking. The scrim can be of mesh type geometry, either woven or non-woven, e.g., non-woven monofilaments heat sealed together at their interstices or a sheet of thermoplastic polymer with holes in a geometric pattern heat-stamped therein, provided the scrim is of substantial open area and low area weight, e.g., from about 0.1 to 5 mil in thickness and an area weight of about 0.002 to 0.2, preferably about 0.003 to 0.1 g/inch$^2$. The scrim is preferably fabricated from a natural or synthetic hydrophobic polymer, e.g., a polyethylene, polypropylene, polyester, or polyamide homopolymer. These polymeric materials are preferably nonplasticized so that they cannot leak impurities into the hydrogel.

The resulting liquid film is then subjected to high energy radiation, such as an electron beam, where it is converted into a solid crosslinked viscoelastic gel. To facilitate production, the liquid film is preferably backed on one or both sides with a thin peelable hydrophilic sheet, e.g., polyethylene or plastic coated release paper, before it is crosslinked. Either or both plastic sheets are then peelably removable after formation of the hydrogel sheet, either before packaging or before use. The hydrogel sheet, which is now a viscoelastic solid, can be cut to desired size and shape for use in applications that contact the skin. Depending upon the application, different types of backing sheets can be used on one or both sides of the hydrogel sheet, e.g., a non-peelable sheet can be used on one side only or a peelable sheet on one side and a less readily or non-peelable sheet on the other.

The polyethylene oxide formulations useful in these applications include those incorporating and binding high concentrations of water while maintaining adequate surface tack (adhesiveness), flexibility and sufficient strength (cohesiveness) to avoid leaving a residue. The starting water soluble linear polyethylene oxide must have a molecular weight high enough to readily crosslink and form a viscous solution for processing. Generally, polymers with weight average molecular weights of about $0.2-6 \times 10^6$ and, preferably about $0.5-5 \times 10^6$ Daltons, are employed. The concentration of polymer therein typically is from about 4 to 35 wt %, preferably about 7 to 20 wt %, of the overall solution, depending upon its molecular weight. The polymer water solution should be viscous enough to form into a sheet-like configuration, e.g., a liquid film of about 0.2 to 4 mm thickness, before crosslinking. Illustrative viscosities range from about 2,000 to 2,000,000 cps. The polymer solution is formed into a liquid sheet or film by coating onto a backing film or sheet. If a scrim is incorporated into the body of the solution, the solution should project beyond both faces of the scrim and all surfaces of the scrim should be wet with the solution. This casting technique can be continuous, thereby forming an elongate continuous sheet or film, or discontinuous, i.e., applying individual pools of the solution of a size and shape corresponding to single units. Any quantity of the viscous solution may be applied to a backing film to form a continuous sheet of hydrophilic gel about 10 to 150 mils (0.254–3.81 mm) capable of yielding a plurality of individual sheets for individual adhesive pads or a large single sheet which can be cut up to form a plurality of adhesive pads or the sheet can be cut into long strips and rolled as a tape. The thickness of the aqueous polymer solution that is applied to the backing sheet generally is dictated by the viscosity of the solution and whether or not a scrim is incorporated therein.

After the viscous solution is applied or cast to the desired thickness, it is then subjected to crosslinking high energy irradiation, such as a high energy electron flux as produced by an electron accelerator. If conditions are selected which exclude atmospheric oxygen, gamma radiation may be used. The major requirement is that the beam of electrons be of sufficient energy to completely penetrate the solution, so that the solution receives a radiation dose effective to crosslink the entire cross section of the sample. Proper dose/energy/thickness relationships are readily available to those skilled in the art of radiation processing and therefore need not be discussed in detail. To achieve the desired degree of uniform crosslinking, i.e., effective to convert the viscous polymer solution into a viscoelastic solid gel, doses typically of about 0.20 to 5.0 Mrads and usually about 0.25–1.5 Mrads are required, depending upon the selected polymer molecular weight, and its concentration. If selected functional or therapeutic additives are included in the viscous polymer solution, the radiation dose may be further shifted within this range. Generally speaking, higher polymer concentrations require higher irradiation doses to produce an acceptable viscoelastic solid gel than lower polymer concentrations.

If a gel is desired which is electroconductive and/or which has a physiological salinity, an electrolyte can be incorporated into the starting viscous solution of the linear polyethylene oxide. Typically an aqueous solution of about 0.1 to 15 wt %, preferably about 0.7 to 10 wt % of a water soluble salt, preferably a dermatologically acceptable metal salt, more preferably an alkali metal salt, e.g., sodium or potassium chloride is employed, the specific concentration depending on the conductivity desired in the hydrogel produced thereform generally transverse conductives of less than 1,000 $(ohm\text{-}cm)^{-1}$ and preferbly less than 100 $(ohm\text{-}cm)^{-1}$ are desired. Such a salt solution is combined with a water soluble linear polyethylene oxide by mixing to produce a homogeneous viscous solution.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the preceding text and the following examples, all temperatures are set forth uncorrected in degrees Celsius and all parts and percentages are by weight unless otherwise indicated.

EXAMPLE 1

A liquid film (ca. 50 mil of a 5 wt % solution of water soluble polyethylene oxide (approximate weight average molecular weight $0.6 \times 10^6$) in deionized water is cast onto a 1.25 mil film of low density polyethylene backing material approximately one foot square. A polyethylene non-woven scrim (0.016 grams/in² area weight) is immersed into the viscous solution near its center. The scrim-containing solution is covered with a second sheet of 1.25 mil low density polyethylene film backing material to produce a sandwich approximately 53 mils thick. This sandwich is then passed across the beam of a Dynamitron Electron Accelerator, manufactured by Radiation Dynamics Inc., Plainview, N.Y. The accelerator is operated at a column voltage of 4.5 MeV. The sandwich is given a dose of 0.50 Mrads of irradiation. The PEO solution is thus converted into a sheet of viscoelastic solid hydrogel. From this sheet samples are cut in prescribed sizes to determine the key properties that characterize the adhesive hydrogel sheet material. These properties are (1) adhesion energy, (2) tack rolling ball distance, (3) percent gel, and (4) equilibrium capacity. The test methods for each of these properties have been previously described herein. The results obtained from this example are as follows:
Adhesion Energy Density (AED)—3.1 g-cm/cm²
Tack Rolling Ball Distance (TRBM)—3 mm
Percent gel (GEL)—82.9
Equilibrium Capacity (EC)—60.3 g/g

EXAMPLES 2-12

The hydrogel sheets in these examples are formed in the same manner as in Example 1, except different concentrations and different irradiation doses are used. Table III gives the conditions employed and results obtained for these examples, viz., the results include adhesion energy, tack rolling ball distance, percent gel and equilibrium capacity.

TABLE III

| Ex. | Conc. (%) | Dose (Mrad) | AED (g/cm) | TRBM (mm) | GEL (%) | EC (g/g) |
|---|---|---|---|---|---|---|
| 2 | 5 | .75 | 2.2 | 18 | 82.2 | 60.1 |

TABLE III-continued

| Ex. | Conc. (%) | Dose (Mrad) | AED (g/cm) | TRBM (mm) | GEL (%) | EC (g/g) |
|---|---|---|---|---|---|---|
| 3 | 5 | 1 | 1.5 | 52 | 89.2 | 46.4 |
| 4 | 5 | 1.5 | 0.5 | 64 | 91.7 | 35.1 |
| 5 | 10 | .5 | 14.3 | 4 | 68.5 | 78.5 |
| 6 | 10 | .75 | 16.8 | 5 | 79.6 | 62.6 |
| 7 | 10 | 1 | 11.3 | 4 | 83.6 | 49.4 |
| 8 | 10 | 1.5 | 6.4 | 10 | 87.8 | 34.4 |
| 9 | 18 | .5 | 74.7 | 3 | 86.0 | 61.6 |
| 10 | 18 | .75 | 54.3 | 9 | 81.0 | 67.9 |
| 11 | 18 | 1 | 40.7 | 0 | 83.1 | 52.9 |
| 12 | 18 | 1.5 | 10.9 | 2 | 85.8 | 48.2 |

EXAMPLES 13-20

In these examples each hydrogel sheet is formed in the same manner as in Example 1, except the molecular weight of the polyethylene oxide is $0.9 \times 10^6$. Table IV sets forth the different concentration-irradiation dose conditions for each of these examples as well as the results obtained.

TABLE IV

| Ex. | Conc. (%) | Dose (Mrad) | AED (g/cm) | TRBM (mm) | GEL (%) | EC (g/g) |
|---|---|---|---|---|---|---|
| 13 | 5 | .5 | 5.8 | 18 | 90.0 | 66.9 |
| 14 | 5 | .75 | 1.5 | 30 | 85.8 | 53.8 |
| 15 | 5 | 1.0 | 0.3 | 55 | 88.9 | 42.3 |
| 16 | 5 | 1.5 | 0.3 | 76 | 93.9 | 30.5 |
| 17 | 9 | .4 | 49.6 | 0 | 79.8 | 72.4 |
| 18 | 9 | .5 | 40.7 | 0 | 82.9 | 60.3 |
| 19 | 9 | 1.0 | 19.0 | 7 | 88.0 | 39.1 |
| 20 | 9 | 2.5 | 1.8 | 83 | 91.4 | 25.0 |

EXAMPLES 21-23

In these examples each hydrogel sheet is formed in the same manner as in Example 1, but the molecular weight of the polyethylene oxide is $4 \times 10^6$. Table V sets forth the different concentration-irradiation dose conditions employed for each of these examples, as well as the results obtained.

TABLE V

| Ex. | Conc. (%) | Dose (Mrad) | AED (g/cm) | TRBM (mm) | GEL (%) | EC (g/g) |
|---|---|---|---|---|---|---|
| 21 | 4 | .5 | 4.1 | 15 | 84.4 | 66.6 |
| 22 | 4 | 1.0 | 0.8 | 180 | 86.3 | 46.3 |
| 23 | 6.5 | .5 | 0.8 | 22 | 90.0 | 65.3 |
| 24 | 6.5 | 1.0 | 1.0 | 23 | 91.9 | 45.7 |
| 25 | 8 | .35 | 51.6 | 2 | 88.4 | 94.5 |
| 26 | 8 | .5 | 15.9 | 2 | 82.8 | 69.4 |
| 27 | 8 | .75 | 6.4 | 21 | 88.1 | 51.2 |
| 28 | 8 | 1.0 | 4.6 | 20 | 89.6 | 42.1 |
| 29 | 8 | 1.5 | 1.2 | 65 | 90.1 | 35.5 |
| 30 | 10.9 | .5 | 25.0 | 4 | 87.0 | 57.4 |
| 31 | 10.9 | .75 | 14.7 | 11 | 78.8 | 59.7 |
| 32 | 10.9 | 1.0 | 13.6 | 4 | 86.4 | 44.9 |
| 33 | 10.9 | 1.5 | 4.2 | 21 | 89.2 | 36.8 |

EXAMPLES 34-36

In these examples each hydrogel sheet is formed in the same manner as in Example 1, except the molecular weight of the polyethylene oxide is $5 \times 10^6$. Table VI sets forth the different concentrations for each of these samples as well as the results obtained.

TABLE VI

| Ex. | Conc. (%) | AED (g/cm) | TRBM (mm) | GEL (%) | EC (g/g) |
|-----|-----------|------------|-----------|---------|----------|
| 34  | 4         | 4.1        | 22        | 92.4    | 63.3     |
| 35  | 5.7       | 2.2        | 21        | 74.7    | 78.9     |
| 36  | 8         | 12.8       | 3         | 79.0    | 53.5     |

EXAMPLES 37-49

In these examples each hydrogel sheet was formed in the same manner as in Example 1, except blends of two different molecular weight polyethylene oxides were used instead of one of single molecular weight of $0.6 \times 10^6$. Table VII sets forth the different concentrations of each average molecular weight polyethylene oxide blended into the mix for each sample as well as the different irradiation doses to which the samples were subjected and the results obtained.

TABLE VII

| Ex. | Wt % polymer 1/ Wt % polymer 2 | Dose (Mrad) | AED (g/cm) | TRBM (mm) | GEL (%) | EC (g/g) |
|-----|-------------------------------|-------------|------------|-----------|---------|----------|
| 37  | 3.7%, $4 \times 10^6$ PEO/    | .35         | 24.9       | 2         | 73.4    | 138.2    |
| 38  | 4.6%, $0.6 \times 10^6$       | .5          | 4.6        | 5         | 79.7    | 92.5     |
| 39  | PEO                           | .75         | 1.2        | 18        | 84.3    | 63.7     |
| 40  |                               | 1.0         | 1.4        | 9         | 87.5    | 59.6     |
| 41  |                               | 1.5         | 0.7        | 54        | 86.8    | 50.5     |
| 42  | 3.7%, $4 \times 10^6$ PEO/    | .5          | 34.0       | 3         | 79.9    | 79.5     |
| 43  | 4.6%, $0.9 \times 10^6$       | .75         | 14.0       | 8         | 86.1    | 53.9     |
| 44  | PEO                           | 1.0         | 10.5       | 13        | 90.2    | 46.1     |
| 45  |                               | 1.5         | 3.4        | 25        | 85.0    | 39.3     |
| 46  | 2%, $5 \times 10^6$ PEO/      | .5          | 15.2       | 5         | 86.7    | 72.7     |
| 47  | 5%, $0.9 \times 10^6$ PEO     | .75         | 8.4        | 13        | 86.8    | 60.2     |
| 48  |                               | 1.0         | 2.7        | 16        | 88.9    | 30.2     |
| 49  |                               | 1.5         | 2.0        | 53        | 93.9    | 21.8     |

COMPARATIVE EXAMPLES A-C

In these examples, each hydrogel sheet is formed in the same manner as in Example 1, except polyacrylic acid of molecular weight $30 \times 10^6$ is used instead of polyethylene oxide. Table VIII sets forth the different concentration-irradiation dose conditions employed for each of these examples and the results are obtained, which clearly show that not every water soluble high polymer can form an adhesive, flexible, absorbent hydrogel sheet of proper strength. These formulations were made in the range of the polyethylene oxide formulations in regard to concentration, viscosity and irradiation dose, and by the same methods. Nevertheless, the crosslinked sheet formed lacks strength and is not adhesive.

TABLE VIII

| Ex. | Wt % Polymer | Dose (Mrad) | AED (g/cm) | TRBM (mm) | GEL (%) | EC (g/g) |
|-----|--------------|-------------|------------|-----------|---------|----------|
| A   | 10           | 0.5         | *          | *         | 80.8    | 61.9     |
| B   | 10           | 0.9         | *          | *         | 90.3    | 38.8     |
| C   | 10           | 2.7         | 0.2        | 30        | 93.7    | 16.0     |

*too weak to measure

EXAMPLE 50

(Electroconductive Gel)

A liquid film (ca. 50 mil) of a solution of 9 wt % polyethylene oxide (approximate weight average molecular weight $0.9 \times 10^6$) and 5 wt % sodium chloride in water is cast onto a 1 mil film of polyethylene backing material. A polyethylene non-woven scrim (o.016 grams/inch$^2$) area weight is immersed into the viscous solution near its center. The scrim-containing solution is covered with a second sheet of 1 mil polyethylene film backing material, producing a sandwich 52 mil thick. This sandwich is then passed across the beam of a Van De Graaf generator, where it receives 0.64 Mrads of irradiation. The liquid PEO film is thus converted to a film of a solid viscoelastic hydrogel. A one inch square sheet is cut from the sandwich and the backing materials on both sides of the sheet are removed. The sheet of scrim-containing solid hydrogel is affixed to the back side of a conductive silver/silver chloride snap, the front of which is embedded in a sheet of adhesive polyurethane foam with the top of the snap protruding therefrom. This configuration of conductive hydrogel, silver/silver chloride button and polyurethane foam, constitutes a test electrode unit. Two identical such electrode units are then joined together hydrogel back to hydrogel back to form an electrode pair. This electrode pair is then tested to determine its electrical responses for use as a medical electrode according to the proposed standards for pregelled ECG disposable electrodes by The Association for the Advancement of Medical Instrumentation (*Standard for Pregelled ECG Disposable Electrodes*. Association for the advancement of medical Instrumentation, February 1984 Revision). The guideline values specified by The Association for such electrode pairs in the following electrical measurements are:

Electrical Characteristic

The values obtained for the electrode pair of Example were:

| V (IO)  | V (O)   | V (10) | V (S)  | (IO)   | Z (60)   |
|---------|---------|--------|--------|--------|----------|
| 0.25 mV | 15.5 mV | 9.8 mV | 5.4 mV | 45 Ohm | 28.8 Ohm |

The hydrophilic sheet is suitable for use as the skin contacting element of a medical electrode assembly.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A method for producing an adhesive sheet of hydrophilic gel which comprises the step of subjecting a liquid film of an aqueous solution having a viscosity of about $2-2,000 \times 10^3$ cps of a linear water soluble polyethylene oxide having a weight average molecular weight from about $0.02-6 \times 10^6$ Daltons, to an amount of high energy radiation from about 0.2 to 5.0 Mrads effective to convert the liquid film to a sheet of the viscoelastic solid having an adhesive face which in the rolling ball tack test gives a rolling ball distance of less than about 10 mm and gives an adhesion energy force in the Adhesion Energy Density Determination Test of about 2 to 80 g-cm/cm$^2$, which adhesive sheet has greater cohesive strength than adhesive strength, whereby the sheet can be removed from a surface to which it is affixed without leaving a visible residue.

2. A solid sheet from about 10 to 150 mils thick of an adhesive hydrophilic gel which is a homogenous aqueous mixture, substantially free of unbound water, monomers and crosslinking agents, consisting essentially of an amount dispersed uniformly in water of from about 4 to 35 wt % of a crosslinked polyethylene oxide, effective to form with the water a tacky surfaced viscoelastic solid, which sheet of hydrophilic gel is produced according to the process of claim 1.

3. A sheet of hydrophilic gel according to claim 2, wherein the hydrophilic gel contains immersed therein a low area-weight scrim.

4. A sheet of hydrophilic gel according to claim 3, wherein the scrim is a sheet of non-woven polyethylene.

5. A sheet of hydrophilic gel according to claim 2, wherein the concentration of the polyethylene oxide in the hydrogel is about 4 to 35 wt %.

6. A sheet of hydrophilic gel according to claim 2, wherein the concentration of the polyethylene oxide in the hydrogel is about 7 to 20 wt %.

7. A sheet of hydrophilic gel according to claim 2, wherein the polyethylene oxide has a molecular weight of about 0.5 to $5 \times 10^6$ Daltons.

8. A sheet of hydrophilic gel according to claim 2, wherein the high energy radiation employed to produce the crossslinked polyethylene oxide is a flux of high energy electrons.

9. A sheet of hydrophilic gel according to claim 2, wherein the exposed surface of the sheet is covered by a backing sheet which is peelably removable therefrom.

10. A sheet of hydrophilic gel according to claim 2, wherein the hydrophilic gel contains immersed therein a low area-weight scrim; wherein the polyethylene oxide has a molecular weight of about 0.5 to $5 \times 10^6$ Daltons and is present in the hydrophilic gel at a conoentration of about 4 to 12%; and wherein the exposed sheet which is peelably removable therefrom.

11. A sheet of hydrophilic gel according to claim 10, wherein the scrim formed of a sheet of non-woven polyethylene.

12. A sheet of hydrophilic gel according to claim 1, wherein the hydrophilic gel contains an electrolyte dissolved therein.

13. A sheet of hydrophilic gel according to claim 1, wherein the electrolyte is a water soluble salt present in a concentration of about 0.1 to 15 wt %.

14. A sheet of hydrophilic gel according to claim 13, wherein the water soluble salt is potassium chloride or sodium chloride.

* * * * *

UNITED STATES PATENT AND TRADEMARK OFFICE
CERTIFICATE OF CORRECTION

PATENT NO. : 4,684,558
DATED : August 4, 1987
INVENTOR(S) : Preston Keusch et al It is certified that error appears in the above-identified patent and that said Letters Patent is hereby corrected as shown below:

Column 1, Line 51:

Reads: "fibrous carrier. The polymers disclosed herein as opera-"

should Read: --fibrous carrier. The polymers disclosed therein as opera---

Column 2, Line 49:

Reads: "prises a karaya gum matrix supporting na electrically"

should Read: --prises a karaya gum matrix supporting an electrically--

Column 3, Line 6:

Reads: "extensible interfacing layer of up to 10mil thickeners"

should Read: --extensible interfacing layer of up to 10 mils thickness--

UNITED STATES PATENT AND TRADEMARK OFFICE
CERTIFICATE OF CORRECTION

PATENT NO. : 4,684,558

DATED : August 4, 1987

INVENTOR(S) : Preston Keusch et al

It is certified that error appears in the above-identified patent and that said Letters Patent is hereby corrected as shown below:

Column 3, Line 67:

Reads: "drogel sheets emphasize the smoothness and east of"

should Read: --drogel sheets emphasize the smoothness and ease of--

Column 4, Line 15:

Reads: "whereas at high concentrations (the limited being PEO"

should Read: --whereas at high concentrations (the limit being PEO--

Column 4, Line 51:

Reads: "and other applications particularly relating the skin. A"

should Read: --and other applications particularly relating to the skin. A--

UNITED STATES PATENT AND TRADEMARK OFFICE
CERTIFICATE OF CORRECTION

PATENT NO. : 4,684,558

DATED : August 4, 1987

INVENTOR(S) : Preston Keusch et al

It is certified that error appears in the above-identified patent and that said Letters Patent is hereby corrected as shown below:

Column 8, Line 28:

Reads: "gel-dose curves of the systems, or the amount of gel"

Should Read: --gel-dose curves of the systems, i.e., the amount of gel--

Column 9, Line 38:

Reads: "upon many factors, including wetability, surface rough-"

Should Read: --upon many factors, e.g., wetability, surface rough- --

Column 10, Line 2:

Reads: "(adhesive bond strength) can be adversely affected too"

Should Read: --(adhesive bond strength) can be adversely affected by too--

UNITED STATES PATENT AND TRADEMARK OFFICE
CERTIFICATE OF CORRECTION

PATENT NO. : 4,684,558

DATED : August 4, 1987

INVENTOR(S) : Preston Keusch et al

It is certified that error appears in the above-identified patent and that said Letters Patent is hereby corrected as shown below:

Column 11, Line 31:

Reads: "levels relative responses of strength and absorbency to"

Should Read: --levels to predict relative responses of strength and absorbency to--

Column 11, Line 44:

Reads: "system, the following parameters are required of a"

Should Read: --system, the following parameters are required for the--

Column 11, Lines 49 thru 53:

Please DELETE THE FOLLOWING:

"As a result of the foregoing, the following parameters are required of a method employed to produce an adhesive crosslinked sheet from a dispersion of a water soluble polyethylene oxide in water using high energy irradiation."

UNITED STATES PATENT AND TRADEMARK OFFICE
CERTIFICATE OF CORRECTION

PATENT NO. : 4,684,558

DATED : August 4, 1987

INVENTOR(S) : Preston Keusch et al

It is certified that error appears in the above-identified patent and that said Letters Patent is hereby corrected as shown below:

Column 12, Line 18:

Reads: "percent). The bottom of the dose range L(C), i.e., where"

Should Read: --percent. The bottom of the dose range L(C), i.e., where--

Column 12, Line 29:

Reads: "U(C)=0.03730-1.245-3.908/C"

Should Read: --U(C)=0.03730C-1.245-3.908/C--

Column 13, Line 13:

Reads: "films can be quantified by the "Tack Rolling Ball "

Should Read: --films, which can be quantified by the "Tack Rolling Ball--

Column 13, Line 21:

Reads: "Pressure Sensitive Tape Council, 120 Waakegan Road"

Should Read: --Pressure Sensitive Tape Council, 120 Waukegan Road--

UNITED STATES PATENT AND TRADEMARK OFFICE
CERTIFICATE OF CORRECTION

PATENT NO. : 4,684,558

DATED : August 4, 1987

INVENTOR(S) : Preston Keusch et al

It is certified that error appears in the above-identified patent and that said Letters Patent is hereby corrected as shown below:

Column 14, Line 39:

Reads: "cm/cm$^2$(11.4 cm$^2$). The preferred gels give values of"

Should Read: --cm/cm$^2$. The preferred gels give values of--

Column 14, Line 40:

Reads: "greater than 7g-cm/cm$^2$(11.4cm$^2$) in this test."

Should Read: --greater than 7g-cm/cm$^2$ in this test.--

Column 15, Line 7:

Reads: "these tests (Peel Strength) are also given in Table 1."

Should Read: --these tests (Peel Strength) are also given in Table I.--

UNITED STATES PATENT AND TRADEMARK OFFICE
CERTIFICATE OF CORRECTION

PATENT NO. : 4,684,558
DATED : August 4, 1987
INVENTOR(S) : Preston Keusch et al It is certified that error appears in the above-identified patent and that said Letters Patent is hereby corrected as shown below:

Column 15, Line 31:

Reads: "a temperature of 25° F.±5° C. The excess water was"

Should read: --a temperature of 25° C.±5° C. The excess water was--

Column 19, Line 47:

Reads: "These properties are (1) adhesion energy, (2) tack roll-"

Should Read: --These properties are (1) adhesion energy density, (2) tack roll- --

Column 20, Line 37:

Reads: "EXAMPLES 21-23"

Should Read: --EXAMPLES 21-33--

UNITED STATES PATENT AND TRADEMARK OFFICE
CERTIFICATE OF CORRECTION

PATENT NO. : 4,684,558
DATED : August 4, 1987
INVENTOR(S) : Preston Keusch et al It is certified that error appears in the above-identified patent and that said Letters Patent is hereby corrected as shown below:

Column 21, Line 42:

Reads: "each of these examples and the results are obtained,"

Should Read: --each of these examples and the results that are obtained,--

Column 22, Line 30:

Reads: "Electrical Characteristic"

Should Read: --Electrical Characteristics

|   |   | Standard Values |
|---|---|---|
| a) | Initial offset voltage V(0)(mV) | <100 |
| b) | Impedance at 60 Hz Z(60)(Ohm) | <3000 |

Other important electrical characteristics which yield superior electrodes:

| c) | Inital resting offset voltage V(10)(mV) | -- |
| d) | Ten second offset voltage V(10)(mV) | <100 |
| e) | Offset voltage after short V(S)(mV) | <100 -- |

Signed and Sealed this

Second Day of February, 1988

*Attest:*

DONALD J. QUIGG

*Attesting Officer*    *Commissioner of Patents and Trademarks*